United States Patent
Young et al.

(10) Patent No.: US 12,064,718 B2
(45) Date of Patent: Aug. 20, 2024

(54) ALIGNMENT NOTCH FOR AN ENDCAP OF A FILTER ELEMENT

(71) Applicants: CUMMINS FILTRATION IP, INC., Columbus, IN (US); Davco Technology, LLC, Saline, MI (US)

(72) Inventors: Joshua Luther Young, Livingston, TN (US); Dean Olson, Cookeville, TN (US); Carey A. Curt, Cookeville, TN (US); Philip S. Hall, Cookeville, TN (US); Zdzislaw Chajec, Saline, MI (US)

(73) Assignees: Cummins Filtration IP, Inc., Columbus, IN (US); Davco Technology, LLC, Saline, MI (US)

( * ) Notice: Subject to any disclaimer, the term of this patent is extended or adjusted under 35 U.S.C. 154(b) by 0 days.

(21) Appl. No.: 18/127,185

(22) Filed: Mar. 28, 2023

(65) Prior Publication Data

US 2023/0233960 A1   Jul. 27, 2023

Related U.S. Application Data

(63) Continuation of application No. 17/056,966, filed as application No. PCT/US2019/040841 on Jul. 8, 2019, now Pat. No. 11,628,385.

(Continued)

(51) Int. Cl.
| | | |
|---|---|---|
| *B01D 29/21* | (2006.01) | |
| *B01D 35/30* | (2006.01) | |
| B01D 35/147 | (2006.01) | |

(52) U.S. Cl.
CPC .............. *B01D 29/21* (2013.01); *B01D 35/30* (2013.01); *B01D 35/147* (2013.01); *B01D 2201/291* (2013.01)

(58) Field of Classification Search
CPC ...... B01D 29/21; B01D 35/30; B01D 35/147; B01D 2201/291; B01D 29/232; B01D 2201/295; B01D 2201/4053
See application file for complete search history.

(56) References Cited

U.S. PATENT DOCUMENTS

| 5,193,579 A | 3/1993 | Bauer et al. |
| 2005/0000876 A1 | 1/2005 | Knight |

(Continued)

FOREIGN PATENT DOCUMENTS

| CN | 1298989 | 6/2001 |
| CN | 101443687 | 5/2009 |

(Continued)

OTHER PUBLICATIONS

CN 2nd Office Action on 2019800395327 dated Jun. 9, 2022 (10 pages).

(Continued)

*Primary Examiner* — Waqaas Ali
(74) *Attorney, Agent, or Firm* — Foley & Lardner LLP

(57) ABSTRACT

A filtration system comprises a housing having a first housing end and a second housing end. The housing defines a central compartment therein. The housing includes an alignment tab disposed on the second housing end. The alignment tab protrudes from the second housing end towards the first housing end. A filter element is positioned within the housing. The filter element includes a first endcap, a second endcap, and filter media positioned between and extending axially between the first endcap and the second endcap. The filter media defines a central opening extending axially therein. An alignment notch is disposed on the second endcap, the alignment notch protruding from the second endcap toward the first endcap.

19 Claims, 6 Drawing Sheets

Related U.S. Application Data

(60) Provisional application No. 62/696,136, filed on Jul. 10, 2018.

(56) References Cited

U.S. PATENT DOCUMENTS

| | | |
|---|---|---|
| 2005/0000886 A1 | 1/2005 | Reynolds et al. |
| 2008/0245719 A1 | 10/2008 | Beard et al. |
| 2009/0020465 A1 | 1/2009 | Jiang et al. |
| 2009/0071892 A1 | 3/2009 | Malgorn |
| 2010/0000414 A1 | 1/2010 | Williams et al. |
| 2010/0025317 A1 | 2/2010 | Fall et al. |
| 2010/0108590 A1 | 5/2010 | Curt et al. |
| 2010/0126919 A1 | 5/2010 | Hawkins et al. |
| 2012/0261326 A1 | 10/2012 | Deschamps et al. |
| 2013/0087497 A1 | 4/2013 | Wells et al. |
| 2014/0190880 A1 | 7/2014 | Krull |
| 2014/0284266 A1 | 9/2014 | Kamp et al. |
| 2016/0045848 A1 | 2/2016 | Campbell et al. |
| 2016/0296864 A1 | 10/2016 | Shimpi et al. |
| 2017/0368487 A1 | 12/2017 | Bannister et al. |

FOREIGN PATENT DOCUMENTS

| | | | | |
|---|---|---|---|---|
| CN | 102256679 | | 11/2011 | |
| CN | 102264446 A | * | 11/2011 | ............. B01D 29/21 |
| CN | 106955538 | | 7/2017 | |
| CN | 108025231 | | 5/2018 | |
| DE | 202008010504 U1 | * | 1/2010 | ......... B01D 46/0031 |
| EP | 2 604 321 | | 6/2013 | |
| GB | 2 364 256 | | 1/2002 | |
| WO | WO-2019/014471 | | 1/2019 | |

OTHER PUBLICATIONS

First Office Action issued for Chinese Patent Application No. 201980039532.7 issued Oct. 27, 2021, 12 pages.

First Office Action issued for Indian Patent Application No. 202047051449 issued Aug. 10, 2021, 8 pages.

International Preliminary Report on Patentability on PCT PCT/US2019/040841 Dtd Jan. 12, 2021.

International Search Report and Written Opinion issued for PCT Application No. PCT/US2019/040841, issued Oct. 9, 2019, 10 pages.

Search Report issued for PCT/US2018/041865, issued Sep. 27, 2018, 2 pages.

Written Opinion issued for PCT/US2018/041865, issued Sep. 27, 2018, 10 pages.

\* cited by examiner

ALIGNMENT NOTCH FOR AN ENDCAP OF A FILTER ELEMENT

CROSS-REFERENCE TO RELATED APPLICATIONS

The present application is a continuation of U.S. patent application Ser. No. 17/056,966, filed Nov. 19, 2020, which is a national stage of PCT Application No. PCT/US2019/040841, filed Jul. 8, 2019, which claims priority to U.S. Provisional Patent Application No. 62/696,136, filed on Jul. 10, 2018. The contents of these applications are hereby incorporated by reference in their entirety.

TECHNICAL FIELD

The present application relates to filter elements for filtering fluids in internal combustion engine systems or the like.

BACKGROUND

Internal combustion engines generally combust a mixture of fuel (e.g., gasoline, diesel, natural gas, etc.) and air. Prior to entering the engine, the fluid (e.g., liquid, air, etc.) is typically passed through a filtration system to remove contaminants (e.g., dust, water, oil, etc.) from the fluid. The filtration system includes a filter element having filter media. As the fluid passes through the filter media of the filter element, the filter media removes at least a portion of the contaminants in the fluid, thereby preventing unwanted contaminants from entering the internal combustion engine. Similarly, lubricant or lube (e.g., engine oil) provided to the engine may also be passed through a filter element so as to remove particulate matter from the lube before communicating to the engine. The fuel or oil may include water, which may accumulate in the filter and may have to be removed.

SUMMARY

Various example embodiments relate to a filtration system. The filtration system comprises a housing having a first housing end and a second housing end. The housing defines a central compartment therein. The housing includes an alignment tab disposed on the second housing end. The alignment tab protrudes from the second housing end towards the first housing end. A filter element is positioned within the housing. The filter element includes a first endcap, a second endcap, and filter media positioned between and extending axially between the first endcap and the second endcap. The filter media defines a central opening extending axially therein. An alignment notch is disposed on the second endcap. The alignment notch protrudes from the second endcap toward the first endcap.

Another example embodiment relates to a filter element. The filter element is positioned within the housing. The filter element includes a first endcap, a second endcap, and filter media positioned between and extending axially between the first endcap and the second endcap. The filter media defines a central opening extending axially therein. An alignment notch is disposed on the second endcap, the alignment notch protruding from the second endcap toward the first endcap.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
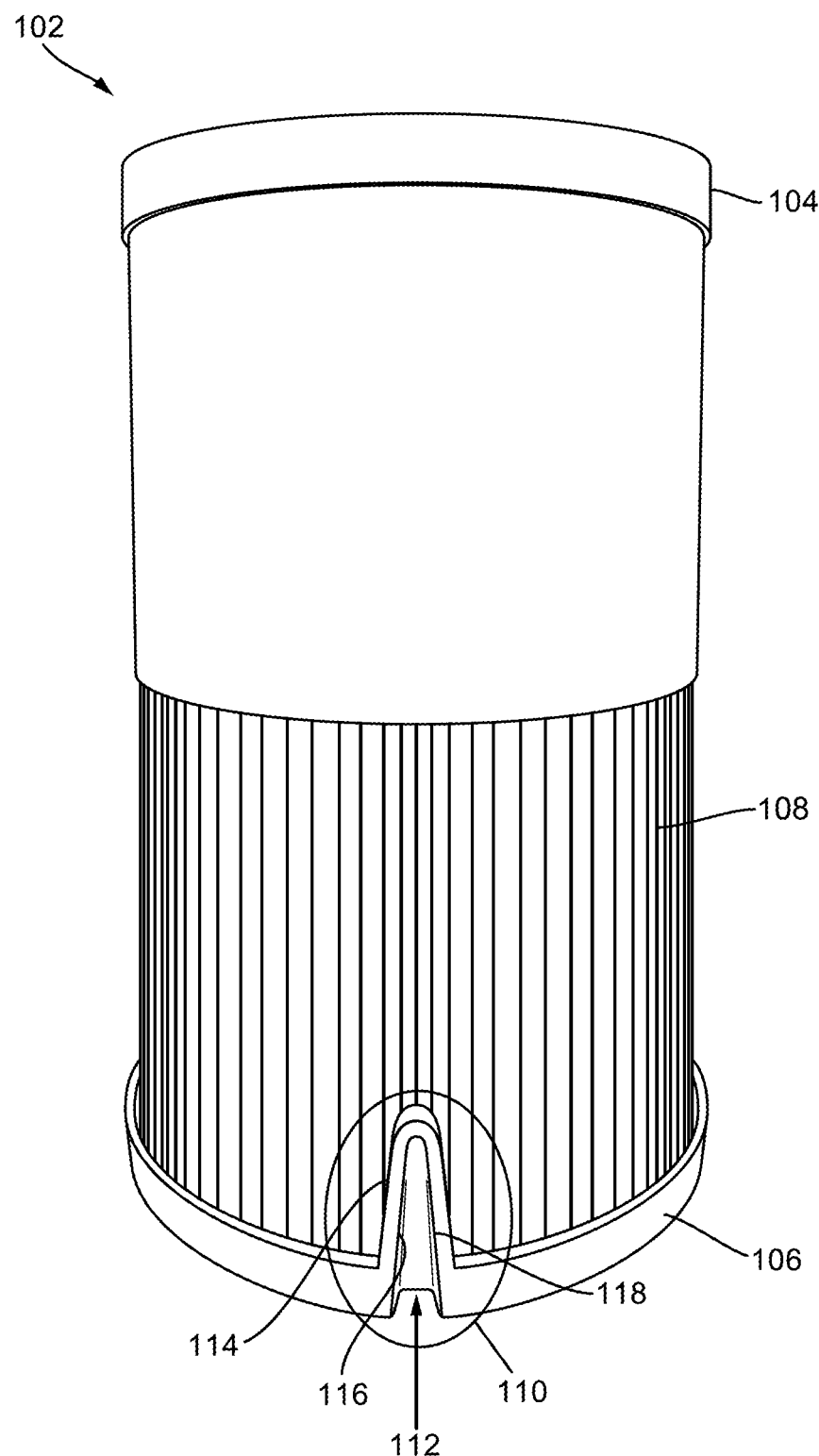
FIG. 1 shows a perspective view of a filter element with an alignment notch according to an example embodiment.

Referring to the figures generally, a filtration system having a filter element with a bottom endcap that includes an alignment notch and a complementary alignment tab disposed on a bottom surface of a housing is described. The filter element with the alignment notch may possess benefits including, but not limited to, providing ease of proper installation, avoiding potential bypass issues, ensuring quality of the product, providing a discernable indication of improper installation, reducing assembly time (by the manufacturer throughout the process to an end user), increasing productivity, reducing product cost, assisting with "blind" assembly of the filter element in the housing, and providing a poke yoke for a wide variety of filter elements with micron ratings associated with alignment notch sizes. Further, in some embodiments, the alignment tab provides a domed/hooded protrusion that creates an added barrier for adhesive (e.g., epoxy, glue, etc.) containment if the adhesive were to overflow and provides protection of the alignment feature from the adhesive overflowing and preventing mating with a complementary housing feature.

The alignment tab and alignment notch provide a "poke yoke" of the filter element in the housing of the filtration system, as the filter element cannot fully seat within the housing unless the alignment tab of the housing engages the alignment notch of the filter element. In other words, the alignment notch ensures the filter element has the same orientation when installed into the housing, as the filter element is rotated during installation to properly engage the protruding alignment tab at the desired orientation of the filter element. Accordingly, the alignment tab and alignment notch construction may be altered to differentiate between filter element types and housings. For example, a filter element may have an alignment notch associated with the micron rating of the filter media such that only certain micron rated filter elements are able to be properly installed into a housing.

In some embodiments, the alignment notch extends axially (e.g., with the "dome" of the alignment notch extending axially towards the other endcap) to provide pleat spreading to a portion of the filter media, which may provide for wider flow valleys between the respective portion of the filter element. Additionally, the vertical alignment notch provides an added barrier for adhesive containment during and after potting of the media. Attaching the endcap (e.g., endplate) to an end of the filter media may include an adhesive (e.g., epoxy, glue, etc.) to embed or pot an end of the filter media with an endcap. The potting of the media in glue or adhesive provides an effective seal by ensuring gas flow through the thickness of the coalescing media (no bypass flow). However, the potting process can lead to adhesive overflow into an opening (e.g., alignment notch) on the endcap either during the potting process or during use of the filter element. Beneficially, the domed vertical alignment notch provides protection against adhesive spillage during manufacturing, which could enter the alignment notch and jeopardize correct cartridge/element installation within the housing body. Additionally, the domed vertical alignment notch protects the filter media pleats from damage by preventing contact with the alignment tab during assembly of the filtration system.

As used herein, the term "notch" refers to a "female" mating element that includes an opening that receives a complementary "male" mating element, such that the male mating feature is disposed within a portion of the opening. The notch may include a domed or similar structure disposed above the opening portion that receives the male mating element, similar to a sleeve. For example, the alignment notch may be a u-shaped or v-shaped domed structure with an opening at the base of alignment notch structure. The term "tab" refers to a male mating element that is disposed within a portion of an opening of a complementary female mating element. The tab may be a solid protrusion in the form or a fin, rib, or other shaped protrusion.

While the present disclosure may describe the alignment tab and alignment notch having a particular size and shape, the alignment tab may be a wide variety of sizes and shapes with complementary sizes and shapes for the complementary alignment notch of the filter element to provide the media differentiation poke yoke feature described herein. Specifically, the alignment notch can be of any configuration, including variations in the shape of the alignment notch element, size of the alignment notch element, and number of alignment notch elements disposed on the endcap. The alignment notch element is configured to have a shape, length, width, and number of elements that is specifically tailored to interface with a housing. Similarly, the alignment tab can be of any configuration, including variations in the shape of the alignment notch element, size of the alignment notch element, and number of alignment notch elements disposed on the endcap. The alignment notch element is configured to have a shape, length, width, and number of elements that is specifically tailored to interface with a housing. While the alignment tab and alignment notch are described as being disposed on the bottom of the housing and filter element, respectively, the alignment tab and the alignment notch may be disposed on a top portion of the housing and filter element, respectively. Due to the shape and location of the alignment notch, the housing does not need a special shape of runway, as the alignment tab allows for a simple shape to be disposed on the housing.

Referring to FIG. 1, a filter element 102 with an alignment feature is shown, according to an example embodiment. The filter element 102 includes a first endcap 104, a second endcap 106, and filter media 108. The filter media 108 is positioned between and extending axially between the first endcap 104 and the second endcap 106. While the filter element 102 in FIG. 1 is shown without a centertube, in some embodiments, the filter element 102 may include a centertube.

The filter media 108 defines a central opening that extends axially therein and is in fluid communication with the outlet 204. The filter media 108 includes an inner clean (e.g., filtered fuel) side and an outer dirty (e.g. unfiltered fuel) side. Accordingly, the filter element 102 is an outside-in flow filter element. In an alternative arrangement, the filter element 102 is an inside-out flow filter element having an inner dirty side and an outer clean side. Fluid to be filtered passes from the dirty side of the filter media 108 to the clean side of the filter media 108. The filter media 108 may include any of paper-based filter media, fiber-based filter media, foam-based filter media, synthetic filter media, pleated filter media, or the like. Pleated filter media refers to filter media 108 that is folded along a plurality of bend lines extending axially along an axial direction between an upstream inlet and a downstream outlet. In some embodiments, a flat sheet of filter media is alternately folded along a plurality of pleat fold lines, thereby defining a pleat block. The pleated filter media may include a plurality of wall segments extend in serpentine manner between the bend lines and define axial flow channels therebetween.

In the particular embodiment shown in FIG. 1, the first endcap 104 is a closed endcap and the second endcap 106 is an open endcap. The first endcap 104 is substantially flat and is configured to engage a substantially flat housing end when the filter element 102 is installed within the housing 302 (not shown). With the exception of the alignment notch (discussed below), an end surface of the second endcap 106 is substantially flat and is configured to engage a substantially flat housing end when the filter element 102 is installed within the housing 302 (a portion is shown in FIG. 3). Referring to FIGS. 1-2B, the second endcap 106 includes a raised surface 202 around the perimeter of the second endcap 106, an outlet 204, and an alignment notch 110. The outlet 204 is configured to be in fluid communication with an outlet of a housing allowing fluid filtered by the filter media 108 to exit the filtration system. The raised surface 202 around the perimeter of the second endcap 106 receives an end of the filter media 108 and keeps the filter media 108 in place. The raised surface 202 includes a circular and horizontally extending first surface 206 and a circular and horizontally extending second surface 208 disposed on opposite ends of the raised surface 202 and being substantially parallel to each other. The second surface 208 is the surface that is adjacent to a housing surface when the filter element 102 is properly installed within a housing. The first surface 206 is adjacent to the filter media 108 and a portion of the alignment notch 110 extends from the first surface 206 radially towards the filter media 108.

Figure 2A:
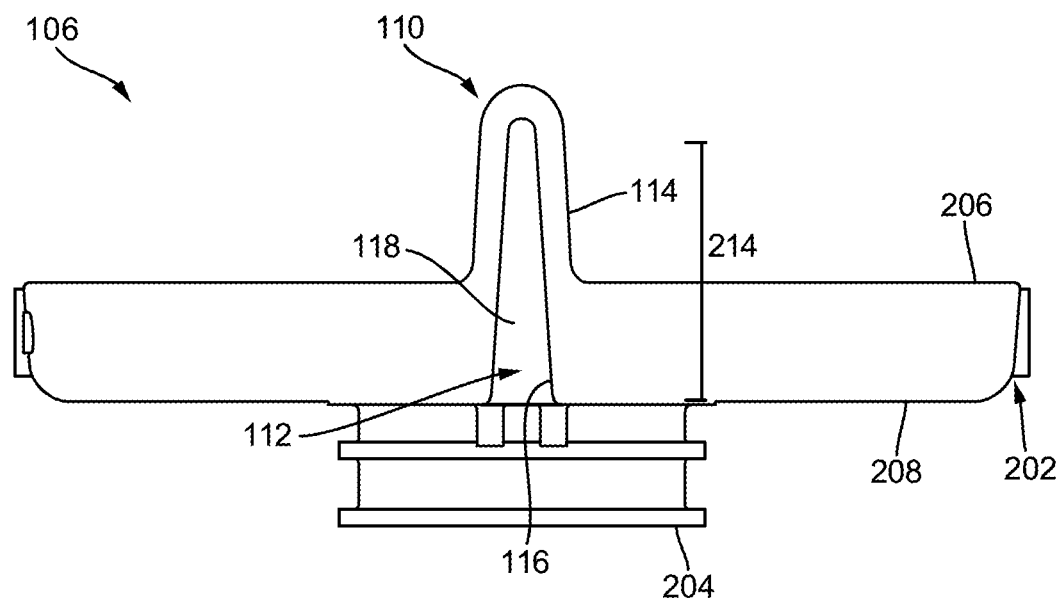
FIG. 2A shows a side view of an endcap with the alignment notch of the filter element of FIG. 1.
Figure 2B:
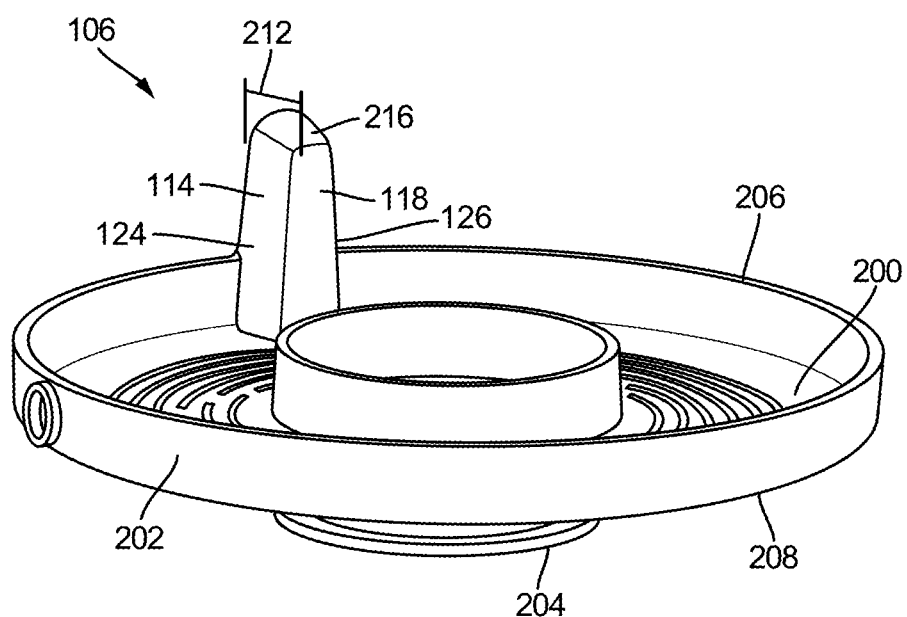
FIG. 2B shows a perspective view of the endcap with the alignment notch of FIG. 2A.
Figure 3:
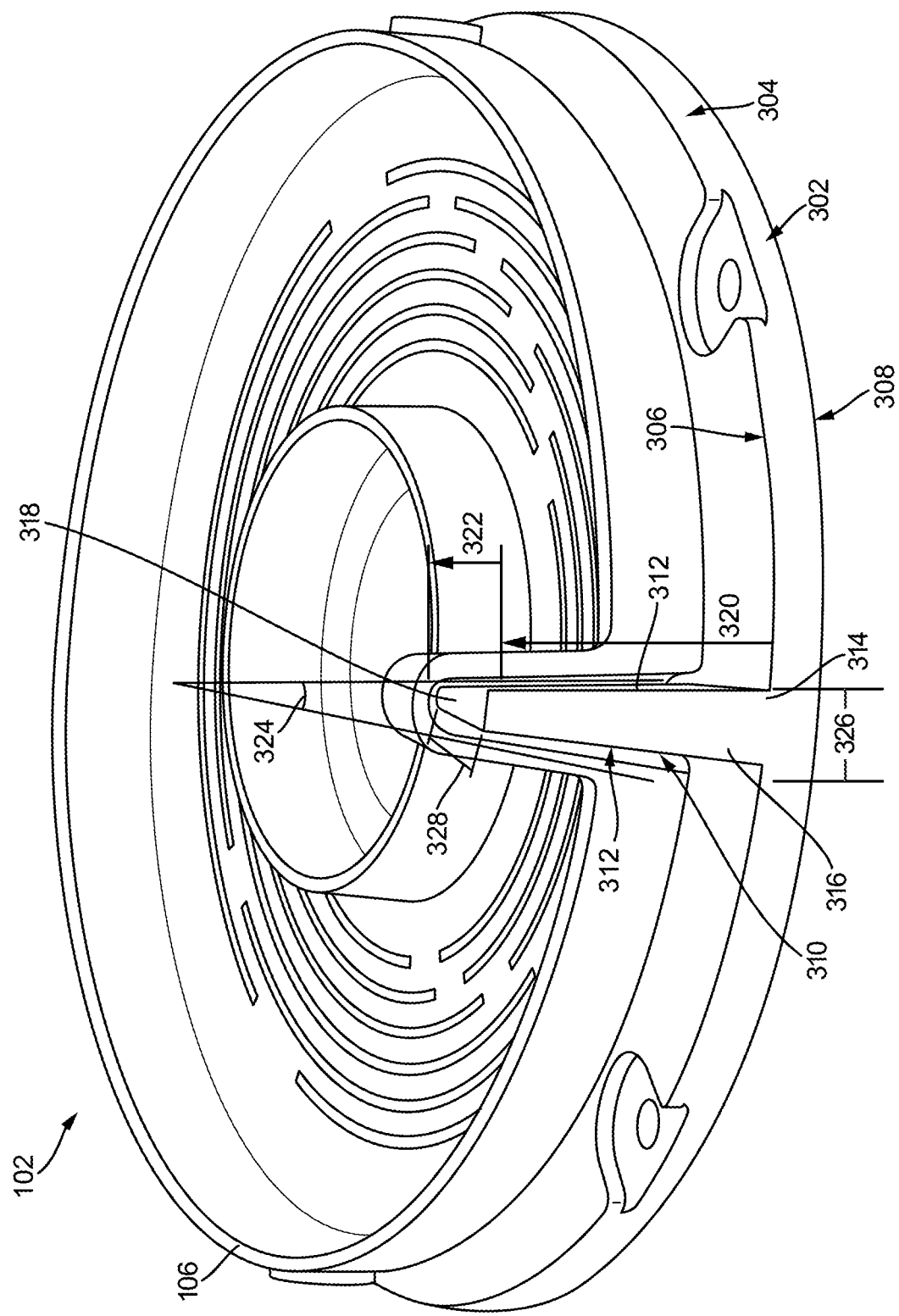
FIG. 3 shows a perspective view of the alignment notch of FIG. 2A engaging a complementary alignment tab of a housing element according to an example embodiment.

As shown in FIGS. 2A and 2B, the alignment notch 110 extends from the second surface 208, axially beyond the first surface 206, in a direction towards the first endcap 104. The alignment notch 110 includes a radially extending first notch surface 114, a radially extending second notch surface 116, and an inner circumferential surface 118. Referring to FIG. 2B, the first notch surface 114 is slightly angled and extends from the media mounting surface 200 in a direction towards the first endcap 104. The first notch surface 114 (e.g., first notch portion) is in contact with an internal surface of the raised surface 202 and extends beyond the first surface 206. Referring to FIG. 2A, the second notch surface 116 (e.g., the second notch surface) is slightly angled and extends away from the second surface 208, such that the second surface 208 forms a rounded portion with the second notch surface 116. The second notch surface 116 extends beyond the first surface 206 and has a similar shape to the first notch surface 114. The first notch surface 114, the second notch surface 116, and the inner circumferential surface 118 form the protruding, domed structure that receives a complementary alignment tab 310 from the housing 302 (as shown in FIG. 3). Specifically, the second notch surface 116 is in contact with the alignment tab 310 (when the filter element 102 is installed within the housing) and the first notch surface 114 is in contact with the filter media 108. The first notch surface 114 and the second notch surface 116 have similar shapes (e.g., u-shaped or rounded v-shaped), with the second notch surface 116 being disposed inward from the first notch surface 114. Thus, the alignment notch 110 is u-shaped both axially and radially.

Beneficially, the alignment notch 110 may provide pleat spreading of the filter media 108 as a result of the depth 212 of the alignment notch 110 into the filter media 108 space. The alignment notch 110 circumvents the issue of adhesive spillage over skirt heights by providing a domed opening protected by the first notch surface 114 and the second notch surface 116. As shown in FIG. 2B, the first notch surface 114 and the second notch surface 116 extend radially inward toward the outlet 204 (e.g., radially inward) by a depth 212, forming an alignment notch 110 with a height 214 and depth 212 to receive a complementary alignment tab 310. The inner circumferential surface 118 closes the alignment notch 110, thereby separating the second notch surface 116 from adhesive spillage and protecting an opening 112 from being blocked by adhesive.

An opening 112 is defined between the second notch surface 116 and the inner circumferential surface 118 of the alignment notch 110. The opening is configured to receive the complementary alignment tab 310 from the housing 302. As will be appreciated, the shape of the second notch surface 116 and the inner circumferential surface 118 may define the shape of the opening 112. As shown in FIG. 2A, the opening 112 is an angled opening having a wider base than a top notch portion 216, with the top notch portion 216 having a rounded, dome-like shape. The top notch portion 216 extends, in a rounded manner, from a first portion 124 of the first notch surface 114 toward a second portion 126 of the first notch surface 114. The opening 112 is configured to have a specific shape and location on the second endcap 106 that allows for a complementary protrusion (e.g., alignment tab 310) of the housing 302 to engage with the filter element 102 in a known and "pre-determined" orientation. Accordingly, the filter element 102 will have the same orientation when installed into the housing 302 when the alignment notch 110 and the alignment tab 310 are properly engaged. As will be appreciated, the shape of the opening 112 can be altered to provide tighter or looser engagements between the filter element 102 and housing 302 allowing for flexibility in the types and number of filter elements that can be installed in certain housings, and vice versa. In other words, a filter element 102 with a particular shape of the alignment notch 110 may be able to properly engage a wide variety of alignment tabs with different shapes and sizes.

Referring to FIG. 3, the engagement of the alignment notch 110 of the filter element 102 and the alignment tab 310 of the housing 302 is shown, according to an example embodiment. A first end portion 304 of the housing 302 that includes an alignment tab 310 is shown. The first end portion 304 includes a first end surface 306 and a second end surface 308 that are axially spaced from each other, substantially parallel to each other, and circular. The alignment tab 310 protrudes axially away from the first end portion 304 toward the other end of the housing 302 (not shown) and toward the location where the filter element 102 is installed. As will be readily apparent, when the filter element 102 is installed within the housing 302 the filter element 102 must be rotated to align the opening 112 of the alignment notch 110 to receive the protruding alignment tab 310 of the housing 302. In this way, the alignment notch 110 and alignment tab 310 provide a poke yoke feature that requires the user or installing entity to ensure that the filter element 102 is rotated and aligned properly before the filtration system can be used.

The alignment tab 310 includes a base portion 314, a tip surface 318, and tab engagement surfaces 312 to form an alignment tab 310 having a tab width 328 and tab height 320 to engage the complementary alignment notch 110. The base portion 314 is adjacent to (or formed with) the first end surface 306 and has a base width 326 related to the angle 324 of the alignment tab 310. The tab engagement surfaces 312 and the front wall 316 form the protruding alignment tab 310. The tab engagement surfaces 312 are the three walls that engage the complementary alignment notch 110 in the filter element 102. While the alignment tab 310 is shown having three surfaces that engage the alignment notch, in some embodiments, only two surfaces of the alignment tab 310 may be configured to engage the alignment notch 110. The alignment tab 310 and alignment notch 110 may have substantially similar heights and widths so as to provide for a snug, tight engagement between the alignment tab 310 and alignment notch 110. Alternatively, and as shown in FIG. 3, the height and/or width of the alignment tab 310 and alignment notch 110 may differ in order to provide some play (e.g., looser fit) between the alignment tab 310 and alignment notch 110 such that a gap 322 exists between the tip surface 318 and the alignment notch 210.

The alignment tab 310 and alignment notch 110 may be formed by surfaces that have a similar or substantially identical angles 324. For example, the left and right side of the alignment notch 110 may form an angle 324 of thirty degrees, and the left and right side of the alignment tab 310 may form an angle 324 of thirty degrees as well. As will be appreciated, the angle 324 of the domed top notch portion 216 of the alignment notch 110 can be altered (e.g., increased or decreased) to direct any adhesive (such as epoxy) into a preferred or ideal adhesive area (e.g., prevent adhesive from spilling into and blocking the opening 112.

Figure 4A:
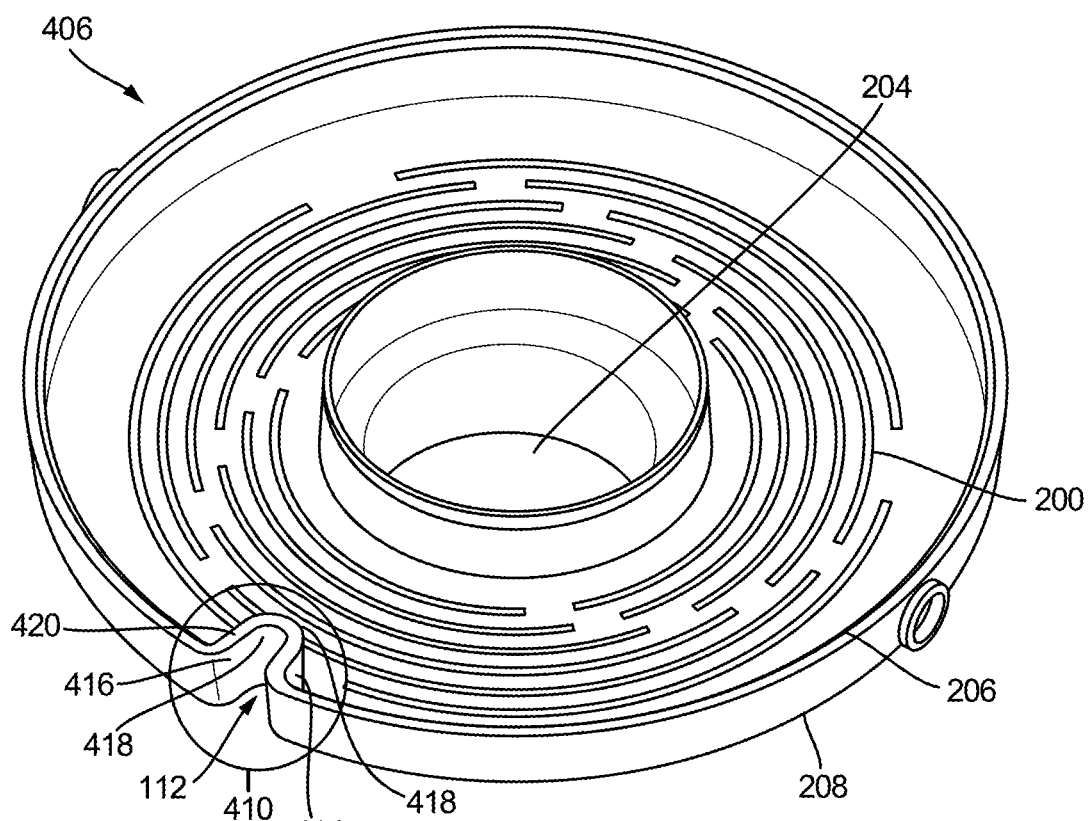
FIG. 4A shows a perspective view of an endcap with an alignment notch according to another example embodiment.
Figure 4B:
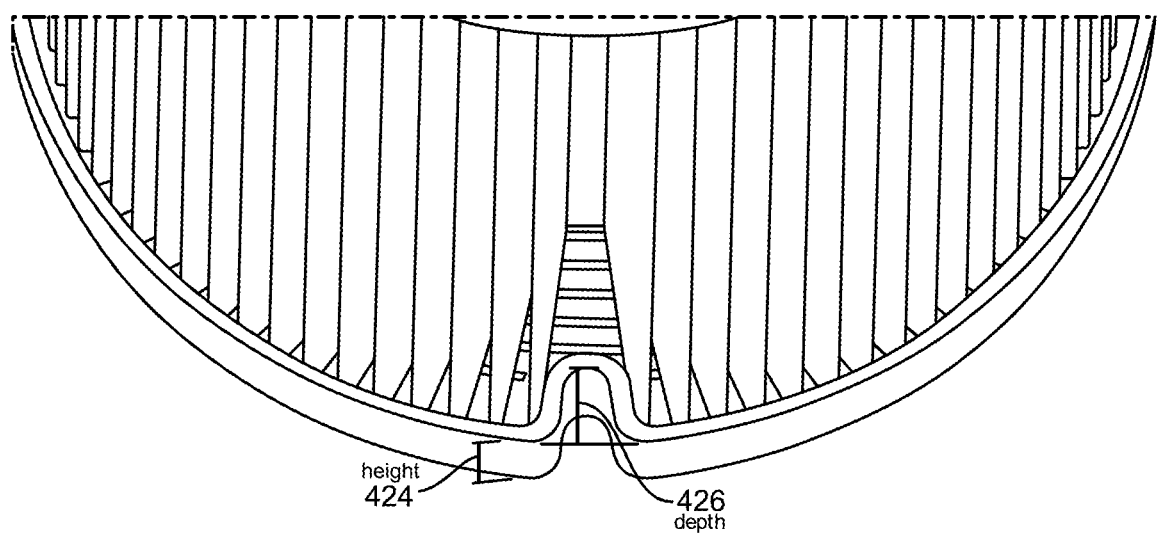
FIG. 4B shows a perspective view of the endcap with the alignment notch of FIG. 4A with filter media attached.

Referring to FIGS. 4A and 4B, an alignment notch 410 having an open configuration (e.g., no dome or cap portion) is shown, according to an example embodiment. The alignment notch 410 is substantially similar to the alignment notch 110. A difference between the alignment notch 410 and the alignment notch 110 is that the alignment notch 410 does not include a domed top notch portion 216 and has a different height 424 and depth 426. Accordingly, like numbering is used in describing the alignment notch 410 and the alignment notch 110. As shown in FIGS. 4A and 4B, a bottom endcap 406 that includes a raised surface 202 around the perimeter of the bottom endcap 406, an outlet 204, and an alignment notch 410. The outlet 204 is configured to be in fluid communication with an outlet of a housing allowing fluid filtered by the filter media 108 to exit the filtration system. The raised surface 202 around the perimeter of the bottom endcap 406 receives an end of the filter media 108 and keeps the filter media 108 in place. The raised surface 202 includes a circular and horizontally extending first surface 206 and a circular and horizontally extending second surface 208 disposed on opposite ends of the raised surface and being substantially parallel to each other. The second surface 208 is the surface that is adjacent to a housing surface when the filter element 102 is properly installed within a housing. Different from the alignment notch 110 of FIGS. 1-3, the alignment notch 410 is flush with the first surface 206, or in other words, the height of the alignment notch 410 is the same height 424 as the raised surface 202 (e.g., the distance from the first surface 206 to the second surface 208.

The alignment notch 410 extends from the second surface 208 to the first surface 206 and extends radially inward toward the outlet 204 at a desired depth 426. Notably, the alignment notch 410 does not extend axially beyond the first surface 206. The alignment notch 410 includes a radially extending first notch surface 414, a radially extending second notch surface 416, and an inner circumferential surface 418. Generally, the second notch surface 416 is in contact with the alignment tab 310 and the first notch surface 414 is in contact with the filter media 108. The first notch surface 414 is slightly angled and radially extends from the media mounting surface 200 in a direction towards the first endcap 104. The first notch surface 114 is in contact with an internal surface of the raised surface 202 and is substantially flush with the first surface 206. The second notch surface 416 is slightly angled and radially extends from, and away from, the second surface 208, such that the second surface 208 forms a rounded portion with the second notch surface 116. The second notch surface 116 is substantially flush with the first surface 206 and has a similar shape to the first notch surface 416. The first notch surface 414 and the second notch surface 416 have similar shapes (e.g., a top portion of a u-shape), with the second notch surface 416 being disposed inward from the first notch surface 414. The inner circumferential surface 418 closes the alignment notch 410, thereby separating second notch surface 416 from adhesive spillage and protecting an opening 412 from being blocked by adhesive. As is readily apparent, the alignment notch 410 is u-shaped both axially and radially.

An opening 412 is defined between the second notch surface 416 and the inner circumferential surface 418 of the alignment notch 410. The opening is configured to receive the complementary alignment tab 310 from the housing 302. As will be appreciated, the shape of the second notch surface 416 and the inner circumferential surface 418 form the shape of the opening 412. As shown in FIG. 4A, the opening 412 is an substantially straight opening. The opening 412 has a specific shape that allows for a complementary protrusion (e.g., alignment tab 310) of the housing 302 to engage with the filter element 102 in a known and "predetermined" orientation. Accordingly, the filter element 102 will have the same orientation when installed into the housing 302 when the alignment notch 410 and the alignment tab 310 are properly engaged. As will be appreciated, the shape of the opening 412 can be altered to provide tighter or looser engagements between the filter element 102 and housing 302 allowing for flexibility in the types and number of filter elements that can be installed in certain housings, and vice versa. In other words, a filter element 102 with a particular shape of the alignment notch 410 may be able to properly engage a wide variety of alignment tabs with different shapes and sizes.

Beneficially, the alignment notch 410 provides pleat spreading of the filter media 108 as a result of the depth 426 of the alignment notch 410 extending into the filter media 108 space. However, due to the lack of domed top portion, the alignment notch is susceptible to adhesive spillage and potential blockage of the opening 112. Additionally, due to the lack of a domed portion on the alignment notch 410 (e.g., it is flush with the first surface 206 and the second surface 208) the alignment tab 310 protrudes axially past the alignment notch 410 and the first surface 206 into the filter media 108. Accordingly, due to the exposed alignment notch 410, fuel surges during operation could create pleat fluttering or movement which would cause the alignment tab 310 to make contact and damage the filter media 108 during operation. Beneficially, the alignment notch 410 partially protects the filter media pleats from damage by preventing contact with the base portion of the alignment tab during assembly of the filtration system.

Figure 5A:
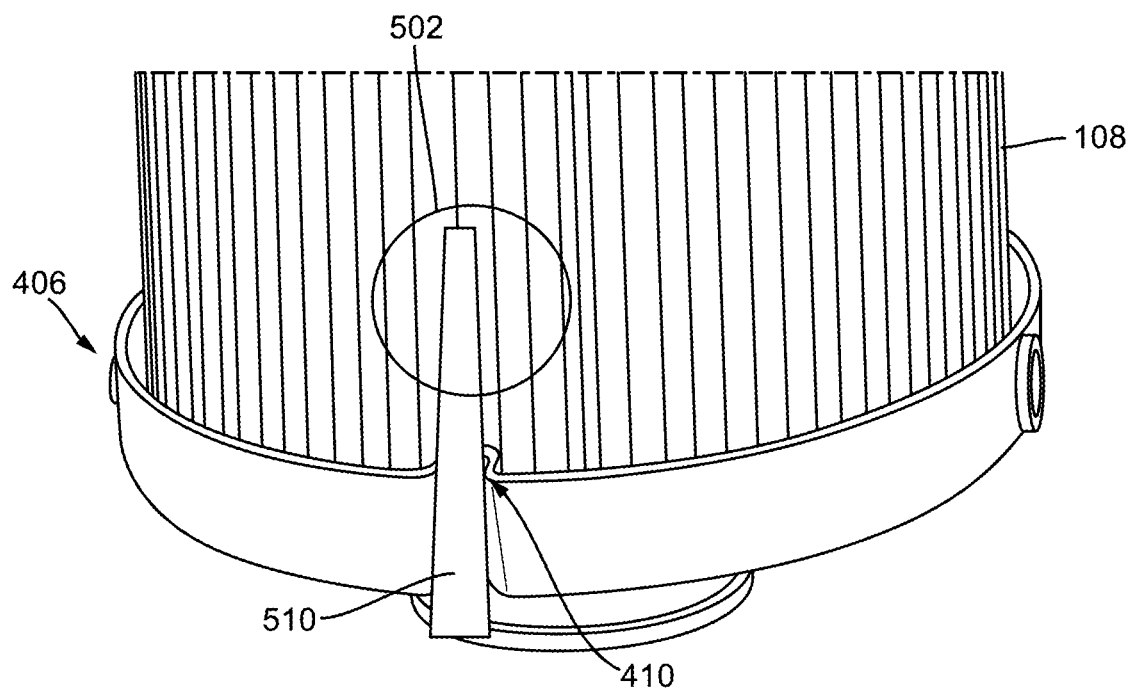
FIG. 5A shows a side view of the endcap with the alignment notch of FIG. 4B.
Figure 5B:
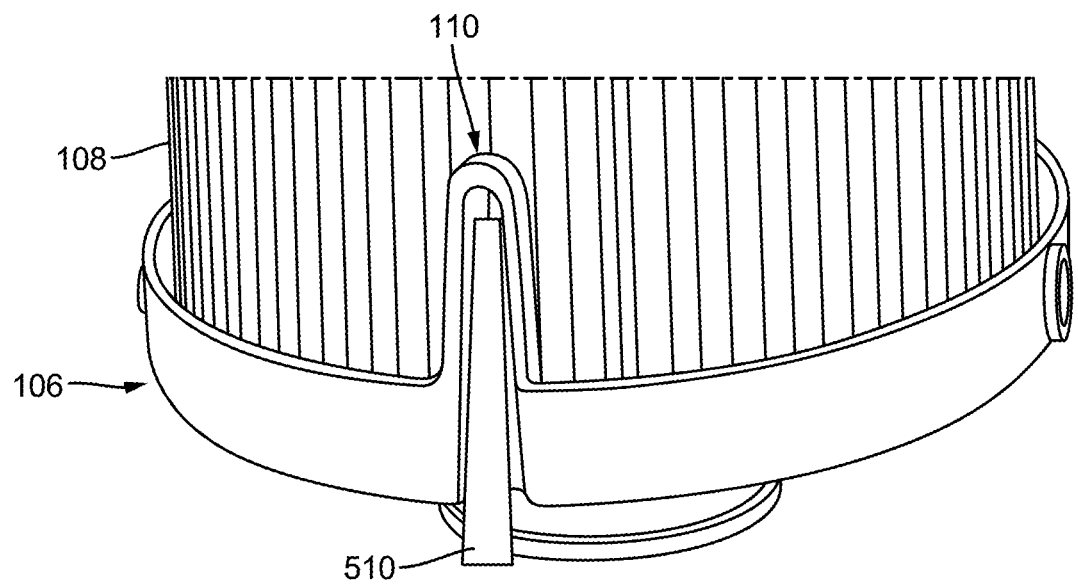
FIG. 5B shows a side view of the alignment notch of FIG. 2A with filter media attached.

Referring to FIGS. 5A and 5B, the alignment notch 410 and the alignment notch 110 are shown, respectively, engaging an alignment tab 510 having an isosceles trapezoid shape. In some embodiments, the alignment tab 510 may have a triangular, trapezoidal, or rectangular shape. As will be appreciated, the engagement of the alignment tab 510 and the alignment notch 410 causes the alignment tab 510 to be in contact with the filter media 108, as shown in FIG. 5A. As discussed above, because the alignment tab 510 protrudes axially past the alignment notch 410 and is exposed (e.g., no domed portion) fuel surges during operation could create pleat fluttering or movement of the filter media 108 which would cause the alignment tab 510 to make contact and potentially damage the filter media 108 during operation. Conversely, as shown in FIG. 5B, the domed alignment notch 110 covers the protruding alignment tab 510 and protects the filter media 108 from being in contact with the alignment tab 510. Beneficially, the alignment notch 110 is configured to spread the filter media 108 in a way that is continuous (once installed) and limits the movement and damage to the filter media 108.

Figure 6A:
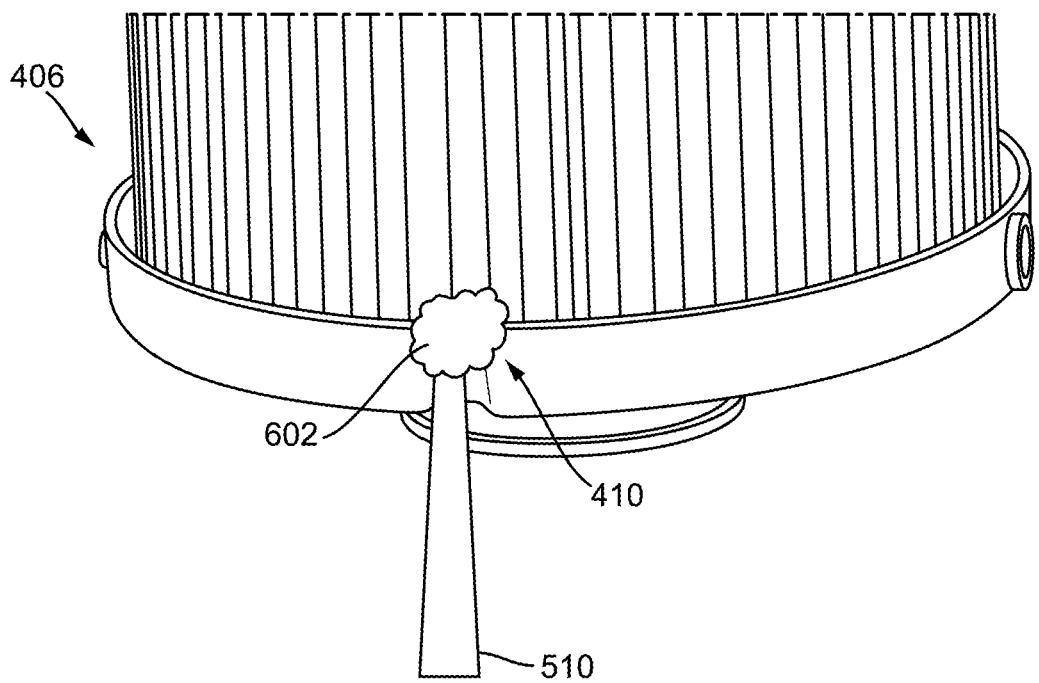
FIG. 6A shows a side view of the endcap with the alignment notch of FIG. 5A with adhesive spillage.
Figure 6B:
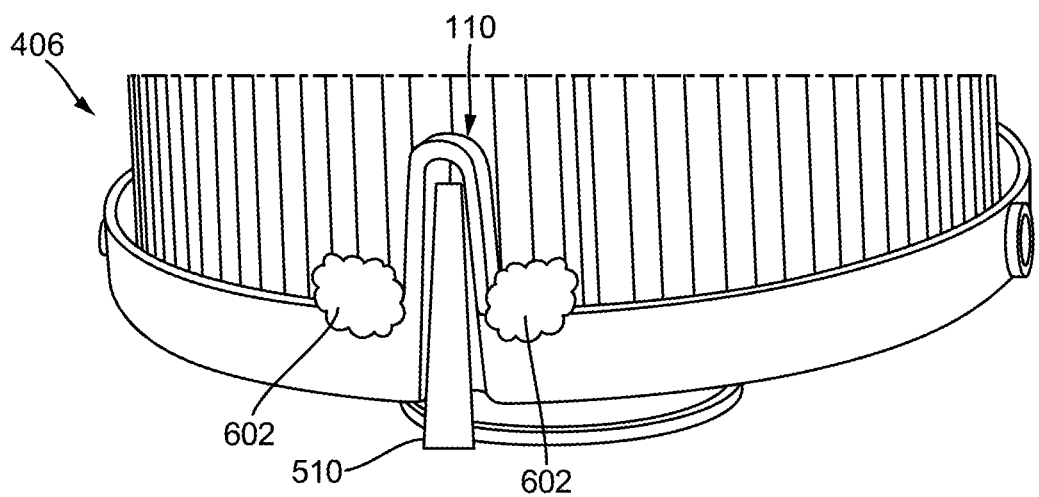
FIG. 6B shows a side view of the endcap with the alignment notch of FIG. 5B with adhesive spillage.

Referring to FIGS. 6A and 6B, the alignment notch 410 and the alignment notch 110 are shown, respectively, with potential adhesive spillage 602 issues. As will be appreciated, the lack of a domed top portion (e.g., an open path to the opening 112) allows for adhesive spillage during manufacturing that enters into and blocks some or all of the opening 112. In those cases, and as shown in FIG. 6A, the alignment tab 510 is unable to enter into the opening 112 and engage the alignment notch 410. Conversely, the domed structure of the alignment notch 110 provides a protective barrier between the opening 112 and location of the adhesive usage (e.g., potting the filter media 108 into the endcap) thereby preventing any adhesive from spilling (e.g., adhesive spillage 602) into and blocking the opening 112. Beneficially, the alignment notch 110 is configured to ensure that the alignment tab 510 is not prevented from engaging the alignment notch 110 due to adhesive spillage.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system, comprising:
    a housing having a first housing end and a second housing end, the housing defining a central compartment therein, the housing comprising:
        an alignment tab disposed on the second housing end, the alignment tab protruding from the second housing end towards the first housing end; and
    a filter element positioned within the housing, the filter element comprising:
        an endcap, comprising:
            a first endcap surface;
            a second endcap surface spaced axially apart from the first endcap surface, the second endcap surface extending along a perimeter of the endcap; and
            an alignment notch element extending from the first endcap surface and protruding axially beyond the second endcap surface; and
        filter media coupled to the endcap, the alignment notch element separating at least one pleat in the filter media from an adjacent pleat in the filter media, the alignment notch element defining an alignment notch.

2. The filtration system of claim 1, wherein the alignment notch element comprises a u-shaped protrusion that comprises a first notch surface and a second notch surface disposed away from the first notch surface, the first notch surface facing at least one pleat of the filter media when the filter element is disposed in the housing and the second notch surface facing the alignment tab when the filter element is disposed in the housing.

3. The filtration system of claim 2, wherein the alignment notch element further comprises a top notch portion extending from a first portion of the first notch surface toward a second portion of the first notch surface and an inner circumferential surface extending from an end of the first portion of the first notch surface toward an end of the second portion of the first notch surface.

4. The filtration system of claim 3, wherein the top notch portion and the first notch surface are configured to separate the at least one pleat in the filter media from the adjacent pleat in the filter media and to impede adhesive from the filter media from contacting the second notch surface.

5. The filtration system of claim 2, wherein the alignment notch element further comprises a top notch portion extending from a first portion of the first notch surface toward a second portion of the first notch surface and an inner circumferential surface disposed between the top notch portion and an endcap surface, the inner circumferential surface disposed between the second notch surface and the filter media.

6. The filtration system of claim 1, wherein the first endcap surface is substantially parallel to the second endcap surface.

7. The filtration system of claim 1, wherein the alignment notch element comprises a u-shaped protrusion that comprises a first notch surface and a second notch surface disposed away from the first notch surface, the first notch surface facing the at least one pleat of the filter media and the second notch surface facing the alignment tab when the filter element is disposed in the housing.

8. The filtration system of claim 7, wherein the first housing end is adjacent a second endcap of the filter element when the filter element and the housing are aligned, the filter element and the housing being properly aligned when the filter element is rotated such that the alignment tab engages the alignment notch, and wherein the alignment tab comprises:
    a first engagement surface protruding away from the first housing end, the first engagement surface adjacent the second notch surface; and
    a second engagement surface spaced apart from the first housing end by the first engagement surface, the second engagement surface adjacent an inner circumferential surface of the alignment notch, the inner circumferential surface of the alignment notch.

9. The filtration system of claim 1, wherein the first housing end is adjacent a second endcap of the filter element when the filter element and the housing are aligned, wherein the filter element and the housing are properly aligned when the filter element is rotated such that the alignment tab engages the alignment notch.

10. The filtration system of claim 9, wherein the alignment tab comprises:
    a first engagement surface protruding away from the first housing end, the first engagement surface adjacent an internal notch surface of the alignment notch;
    a second engagement surface protruding away from the first housing end, the second engagement surface adjacent the internal notch surface of the alignment notch; and
    a third engagement surface protruding away from the first housing end, the third engagement surface extending from the first engagement surface toward the second engagement surface.

11. The filtration system of claim 10, wherein the third engagement surface is adjacent an inner circumferential surface of the alignment notch, the inner circumferential surface extending from an end of a first surface of the internal notch surface toward an end of a second surface of the internal notch surface.

12. The filtration system of claim 1, wherein the alignment tab comprises an isosceles trapezoidal protrusion, and wherein the alignment notch element comprises a hollow isosceles trapezoidal protrusion.

13. A filter element, comprising:
an endcap, comprising:
a first endcap surface;
a second endcap surface spaced axially apart from the first endcap surface, the second endcap surface extending along a perimeter of the endcap; and
an alignment notch element extending from the first endcap surface and protruding axially beyond the second endcap surface; and
filter media coupled to the endcap, the alignment notch element separating at least one pleat in the filter media from an adjacent pleat in the filter media, the alignment notch element defining an alignment notch, the alignment notch element comprising an inner circumferential surface extending axially away from the first endcap surface and closing the alignment notch so as to prevent adhesive from spilling radially into the alignment notch,
wherein the alignment notch element comprises:
a protrusion having one of a u-shape and a v-shape, the protrusion comprising a first notch surface and a second notch surface disposed away from the first notch surface, the first notch surface adjacent at least one pleat of the filter media; and
a top notch portion extending spaced axially apart from the second endcap surface, the inner circumferential surface extending from an end of a first surface of the first notch surface toward an end of a second surface of the first notch surface.

14. The filter element of claim 13, wherein the top notch portion and the first notch surface are configured to separate the at least one pleat in the filter media from the adjacent pleat in the filter media and to impede the adhesive from the filter media from contacting the second notch surface.

15. The filter element of claim 13, wherein the top notch portion extends from a first portion of the first notch surface toward a second portion of the first notch surface, the inner circumferential surface disposed between the top notch portion and an endcap surface, the inner circumferential surface disposed between the second notch surface and the at least one pleat of the filter media.

16. The filter element of claim 13, wherein the alignment notch defines an opening at an axial end of the alignment notch, the top notch portion at least partially covering the opening.

17. The filter element of claim 13, wherein an axial end of the alignment notch defines a dome-like shape.

18. The filter element of claim 13, wherein the alignment notch defines an angled opening, a first width of the angled opening proximate to a first axial end of the alignment notch being greater than a second width of the angled opening proximate to a second axial end of the alignment notch.

19. The filter element of claim 13, wherein the first endcap surface is substantially parallel to the second endcap surface.

* * * * *